Patented Mar. 6, 1923.

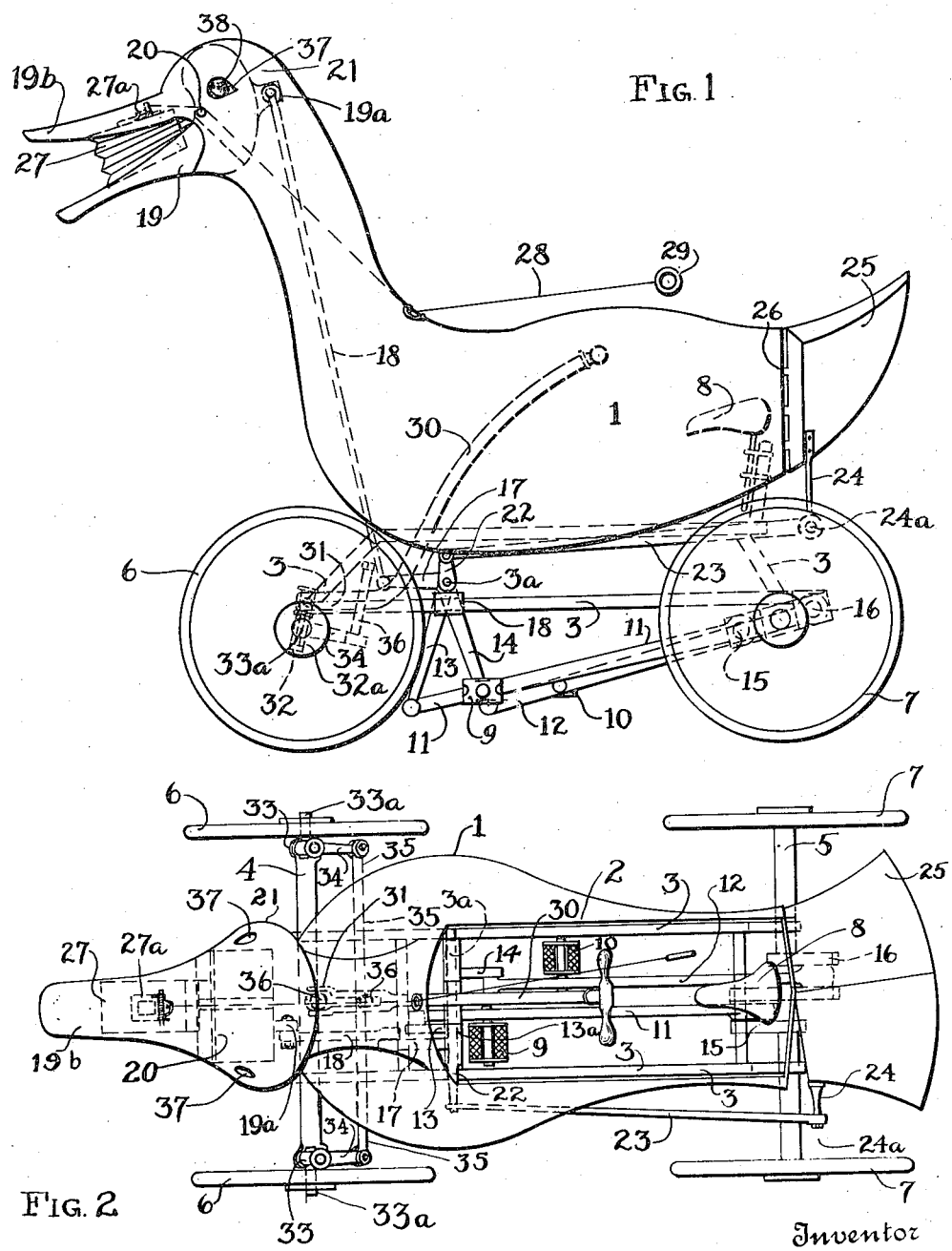

1,447,953

UNITED STATES PATENT OFFICE.

FREDERICK HERSCHMANN, OF NEW YORK, N. Y.

VEHICLE.

Application filed May 10, 1921. Serial No. 468,337.

*To all whom it may concern:*

Be it known that I, FREDERICK HERSCHMANN, a citizen of the United States, and resident of New York, in the county of New York and State of New York, have invented certain new and useful Improvements in Vehicles, of which the following is a specification.

This invention relates to vehicles, having reference particularly to a pedal operable vehicle adaptable for the use of children.

The invention has for its objects the provision of a vehicle of this character which is attractive in form, easy to operate and calculated for affording amusement and a means for healthful outdoor exercise.

In carrying out my invention, I employ a vehicle body in the form of an animal, preferably a duck having a bill, comprising a fixed and a swinging member which opens and closes, and eyes that blink, as the vehicle is propelled, and a laterally swinging or wagging tail member, a frame for supporting said body, traction wheels therefor, pedals for operating the device, means for transmitting motion to said swinging members, a sounding device simulating sounds of the animal and other novel features, all as hereinafter fully described and specifically set forth in the appended claims.

In the accompanying drawings forming part of this specification, Figure 1 is a side view, illustrating an embodiment of my improvements; and Fig. 2 is a plan view thereof.

In the drawings, 1 indicates the body of the vehicle which is hollow and shaped to represent a duck, but I do not confine myself to this specific shape, as I may employ figure representations of other animals.

The said body has a pit 2, extended therethrough, and it is mounted on a suitable frame or chassis 3, laterally across which are mounted the axles 4 and 5 which carry, respectively, the traction wheels 6 and 7. A vertically adjustable seat 8 is mounted on the frame 3 for accommodation of the child driving the vehicle.

As a means for driving or propelling the vehicle, I provide pedals 9 and 10, these are pivoted respectively to connecting rods 11 and 12, which respectively engage at one end, oscillating levers 13 and 14 which swing on a lateral shaft $3^a$ journaled in suitable bearings of the frame 3; the other ends of the connecting rods 11 and 12 are respectively in connection with members 15 and 16 of a double crank which forms part of the rotatable rear axle 5, to which the rear wheels 7 are fixed, whereby oscillatory movement of the levers 13 and 14 imparted by operating the pedals 7 and 10, transmits rotary movement to the traction wheels 7 for propelling the vehicle.

Extended radially from a sleeve $13^a$, of the lever 13 is an arm 17, which is in pivotal engagement with the lower end of a rod 18, said rod is extended to and in pivotal engagement with an extension $19^a$, of a swinging jaw or bill-member 19, mounted on a pivot 20 extended laterally through the head 21, of the vehicle body 1; a relatively short arm 22 also extends from the sleeve $13^a$, and is flexibly joined to one end of a rod 23, the other end of said rod in flexible connection with a stud $24^a$ of a hanger 24, which is fixed to a laterally swinging tail member 25 of the body 1, said member connected to said body by means of a suitable hinge 26.

Located over the swinging jaw-member 19 is a fixed jaw-member $19^b$; and fixed between said jaw-members is a sounding device of the well known bellows, and spring-plate valve construction, as 27; the valve $27^a$ of said sounding device is connected by means of a cord 28 to a handle 29, whereby said valve may be opened and held open when it is desired to operate the vehicle without operating said sounding device.

As a means for steering the vehicle, I provide a steering rod 30, having a forked end 31, which is connected to a sleeve $32^a$ of a spindle 32 of the forward axle 4, whereby said steering-rod may be given lateral swinging movement.

Connected to each end of the axle 4 is a swinging bearing 33, having a spindle $33^a$ for revolubly mounting the forward traction wheels 6. Said bearings each have an arm 34 extended rearwardly, and said arms are connected by means of a cross rod 35, having an upwardly extended pin 36 which passes through the fork 31 of the steering rod 30, whereby when the rod 30 is oscillated, the wheels 6 are swung around to change the course of the vehicle.

Through each side of the head 21, of the body 1, is an eye hole 37, registering with an eye-ball 38, painted on the swinging jaw-member 19, whereby said eye-ball moves to give a winking effect to the eye as the vehicle is operated.

In use, it is manifest that as the lever 13 is oscillated, the arm 17 transmits swinging motion to the jaw-member 19, whereby the sounding device 27 is operated, and the arm 22 transmits oscillatory movement to the tail member 25, thus imparting a semblance of life to the body 1, for the purpose of amusing the users of the device, the device at the same time affording a means for healthful outdoor exercise.

I do not wish to be understood as confining myself to the specific mechanical details and formation of the elements of my improvements as herein shown and described, as under the spirit of my invention, I may employ such variations as may fall within the scope of the appended claims.

Having thus described my invention, what I claim as new and desire to secure by Letters Patent, is:

1. In a vehicle of the character described, a body representation of an animal having a fixed and a movable jaw, an oscillatory tail, a sounding device located between said jaws, a frame and traction wheel carrying said body, manually operable means for propelling the vehicle, and means for transmitting movement from said manually operable means to said movable jaw and oscillatory tail.

2. In a vehicle of the character described, a body representation of an animal having a fixed and a movable jaw, blinking eyes, an oscillatory tail, a sounding device located between said jaws, a frame and traction wheels carrying said body, manually operable means for propelling the vehicle, and means for transmitting motion to the wheels of said vehicle and the movable members of the body whereby a lifelike appearance is imparted to said body while the vehicle is being propelled.

3. In a device of the character described including a body simulating an animate object, a vehicle carrying the body, means for operating the vehicle, a sound producing device carried by the body and operated upon the operation of the vehicle operating means, and means for preventing the functioning of the sound producing device during the operation of the vehicle.

Signed at New York city in the county of New York and State of New York this 23rd day of March A. D. 1921.

FREDERICK HERSCHMANN.